Aug. 24, 1965     P. C. WOODLAND     3,201,911
METHOD OF FORMING A PACKAGE HAVING AN
ELECTRICAL ZIP TAPE
Filed March 13, 1961
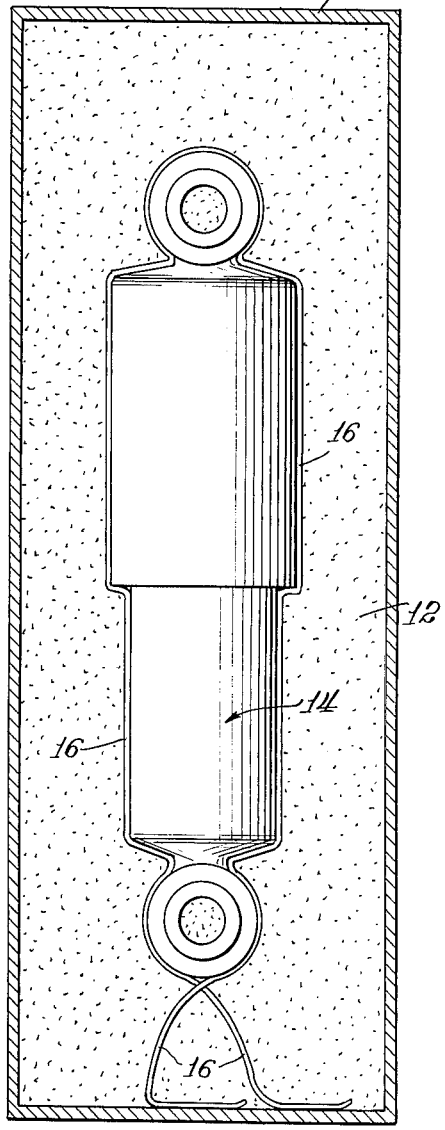
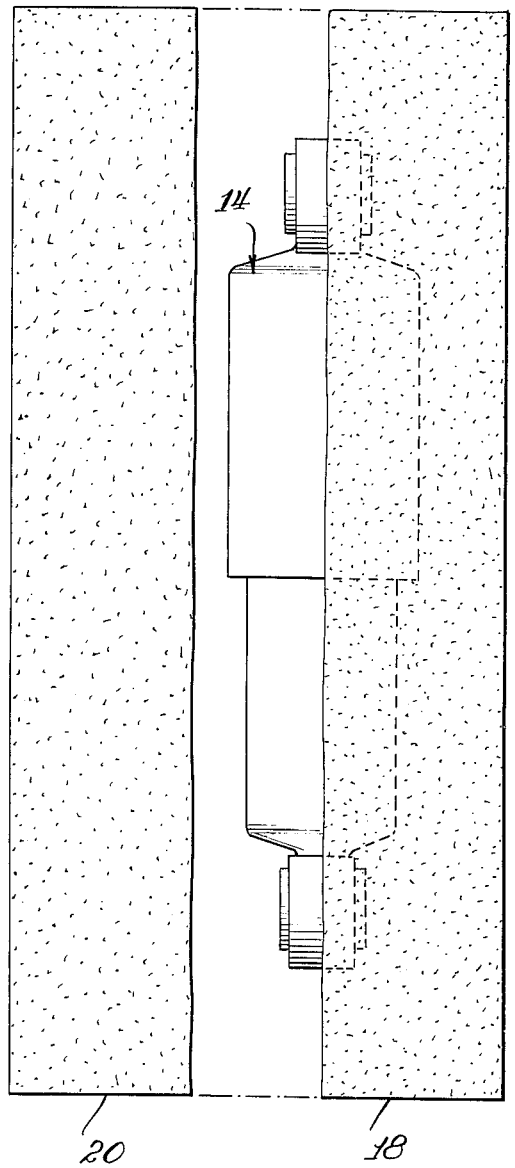
INVENTOR.
Paul C. Woodland

United States Patent Office 3,201,911
Patented Aug. 24, 1965

3,201,911
METHOD OF FORMING A PACKAGE HAVING AN ELECTRICAL ZIP TAPE
Paul C. Woodland, Midland, Mich., assignor to The Dow Chemical Company, Midland, Mich., a corporation of Delaware
Filed Mar. 13, 1961, Ser. No. 95,135
2 Claims. (Cl. 53—36)

This invention relates to a packaging method for protecting an article against moisture and shock, which method is especially useful in long-term storage, or in overseas shipment.

A common method used for packaging articles to meet the conditions above mentioned, is to employ a paper box containing a wrapped article together with a bag of desiccant a metal foil overwrap which may be fabric backed, a further paper overwrap, followed often by another carton, and the entire assembly sealed in a wax impregnated fabric.

The method of packaging according to the present invention represents a distinct improvement over known methods of the prior art. Briefly, the method of the invention consists of encasing the article to be packaged in a foamed thermoplastic material in which a wire has been arranged about the article. The package is easily opened by causing an electrical current to flow through the wire which is thereby heated, so that it will melt the foamed plastic. By pulling the wire, as one would a conventional zip tape on a cigarette package, the foamed body is severed into two parts, whereupon the article may be readily removed.

The main object of this invention is to provide an improved method for packaging an article.

A more specific object of the invention is to provide an improved method for packaging an article to protect the contents against moisture and shock.

Another object of the invention is to provide an improved method for packing an article so that it can be placed in long-term storage, and can withstand comparatively rough handling.

These and further objects and features of the invention will become more apparent from the following description and accompanying drawing wherein:

FIG. 1 is an illustration of an article in a container in readiness for treatment according to the method of the invention; and FIG. 2 is a side view of an article in the process of being removed from a package formed according to the method of the invention.

Referring now to the drawing, numeral 10 identifies a box-like mold, or form, which may have a cover (not shown) to provide an enclosed container in which a quantity of granular thermoplastic foaming composition 12 is placed. The foaming composition may contain a violatile blowing agent, and may be of any well known type, such for example, one of the types disclosed in U.S. Patent 2,848,428, which issued on August 19, 1958. An article 14 to be packaged, is positioned in the mold, and a strong, bare, electric conducting wire 16, such as Nichrome, is placed around the article, in a given plane. The wire 16 may be placed in physical contact with the article 14 or may be spaced a slight distance therefrom depending upon the heat sensitivity of the material of the article being packaged. The ends of the wire are arranged to project from the mold, as shown. Additional foaming composition is placed in the mold to cover the article, following which the mold may be closed. The foaming composition is then heated or otherwise treated whereupon the composition will expand, and form a cellular, moisture proof body. After sufficient time has elapsed to set up the foaming composition, the mold is opened and the enclosed article is removed.

When it is desired to remove the article 14, it is only necessary to apply an electric current to heat the wire 16 following which the wire may be manipulated to cut the material of the package into two parts 18 and 20 which are then easily separated, allowing convenient removal of the article.

While the use of a granular plastic foaming material has been mentioned, it may be desirable to injection mold, a foamed plastic, or a package may be built up from individual sections of foamed material secured together by adhesive. In any event, such variations in the manner of forming the packaged article, will incorporate the basic concept of the invention, which is to provide a moisture proof and shock resistant package, allowing easy removal of the enclosed article by the use of an enclosed heated wire.

The foregoing description has been given in detail, without thought of limitation since the inventive principles involved are capable of assuming other forms without departing from the spirit of the invention, or the scope of the following claims.

What is claimed is:

1. A method of packaging an article and removing the article from the package comprising the steps of placing a continuous electric conducting wire around the article, enclosing the article and wire in a foamed thermoplastic material with opposite ends of the wire disposed externally of the package, causing an electric current to flow in the wire whereby it is heated, and manipulating the heated wire to cut the thermoplastic material into parts so that the article may be removed from the package.

2. A method of packaging an article and removing the article from the package comprising the steps of placing a continuous bare electric conducting wire around the article in spaced relation thereto and in a given plane, surrounding the article and wire with granular thermoplastic foaming material containing a volatile blowing agent care being taken to provide that the opposite ends of the wire are external of the package, heating the foaming material to cause an expansion of the foaming material and form a cellular, moisture proof enclosure for the article, subsequently causing an electric current to flow through the wire whereby it is heated, and manipulating the heated wire to cut the thermoplastic material into parts so that the article may be removed from the package.

References Cited by the Examiner
UNITED STATES PATENTS

| | | | |
|---|---|---|---|
| 2,302,152 | 11/42 | Snyder | 101—122 |
| 2,727,128 | 12/55 | Jaye | 25—105 X |
| 2,731,912 | 1/56 | Welsh | 101—129 |
| 2,780,350 | 2/57 | Simon et al. | 53—36 X |
| 2,985,287 | 5/61 | Schulz. | |

FOREIGN PATENTS 813,028  5/59  Great Britain.

FRANK E. BAILEY, Primary Examiner.
ROBERT A. LEIGHEY, ROBERT E. PULFREY,
Examiners.